S. O. REA.
POULTRY FEEDER.
APPLICATION FILED DEC. 14, 1914. RENEWED JAN. 6, 1919.
1,312,576.
Patented Aug. 12, 1919.
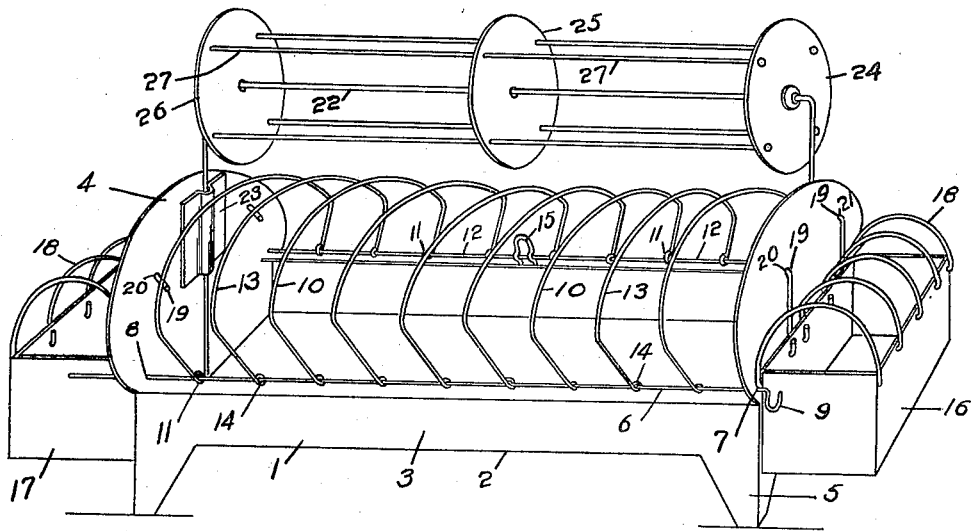
Fig. 1.
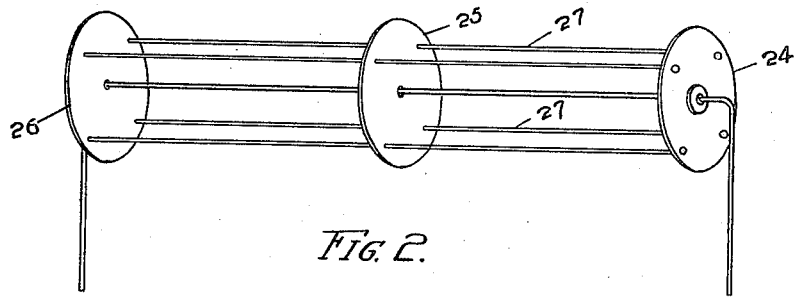
Fig. 2.
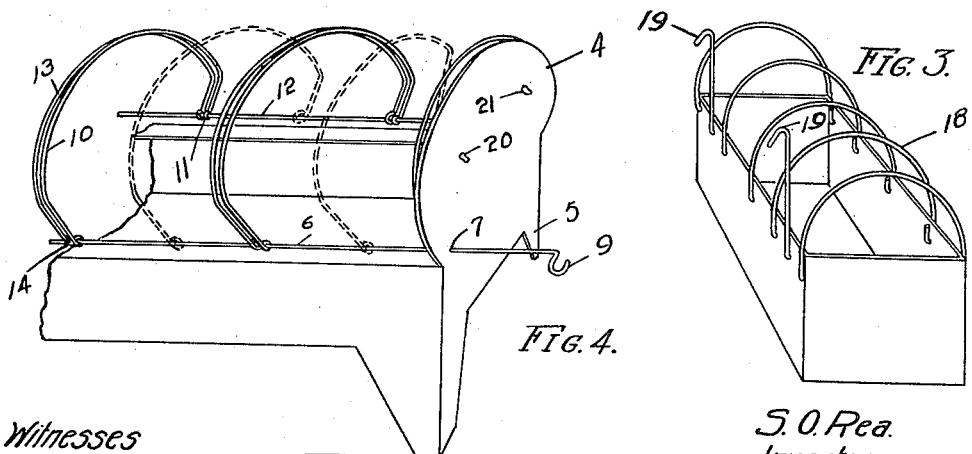
Fig. 3.
Fig. 4.
Witnesses
S. O. Rea.
Inventor
Attorney

UNITED STATES PATENT OFFICE.

STANLEY OSBORNE REA, OF TORONTO, ONTARIO, CANADA.

POULTRY-FEEDER.

1,312,576.  Specification of Letters Patent.  Patented Aug. 12, 1919.

Application filed December 14, 1914, Serial No. 877,236. Renewed January 6, 1919. Serial No. 269,929.

*To all whom it may concern:*

Be it known that I, STANLEY OSBORNE REA, a subject of the King of Great Britain, and resident of 72 Glencairn Ave., in the city of Toronto, county of York, Province of Ontario, in the Dominion of Canada, have invented certain new and useful Improvements in Poultry-Feeders, of which the following is a specification.

The invention relates to improvements in poultry feeders as described in the present specification and shown in the accompanying drawings that form part of the same.

The invention consists essentially of the novel construction and arrangement of parts, whereby a trough or bench is so arranged as to be separated into divisions guarded from above to avoid contamination of the food from the actions of the fowl.

The objects of the invention are to facilitate the feeding of various kinds of fowl, to provide a poultry feeder, the several receptacles of which are protected by suitable guards thus preventing the fowl from scattering the food and also insuring the preservation of the food in its original state and generally to provide a poultry feeder of simple and cheap construction, durable and efficient.

In the drawings, Figure 1 is a perspective view of the device complete.

Fig. 2 is a perspective view of the revolving rack used to prevent the fowl from resting on the wire guards.

Fig. 3 is a perspective view of one of the subsidiary feeders detached from the main feeder.

Fig. 4 is a perspective view of a part of the main feeder showing the means for adjusting the wire guards.

Like numerals of reference indicate corresponding parts in each figure.

Referring to the drawings, 1 is a trough or base made preferably of sheet metal and being composed of the bottom 2, sides 3 and the enlarged upwardly extending ends 4 and supported on the legs 5.

6 is a rod running the full length of the feeder 1 at one side thereof and sliding in the holes 7 and 8 in the ends 4 of the feeders and at one end bent to form the handle 9.

10 are wire divisions bent in arch shape and at one of their ends rigidly secured to the rod 6 and at their other ends formed into eyes 11 loosely encircling a rod 12.

13 are wire divisions shaped correspondingly to the wires 10 and at one end loosely encircling the rod 6 by the eyes 14 and at their other ends rigidly secured to the rod 12.

It will thus be seen that the arched wires 10 and 13 in conjunction with the rods 6 and 12 form stalls or mangers dividing the receptacle 1, thus separating the fowl during feeding and preventing them from getting in with the food or water in the receptacle, the said top swinging on the rod 6 at one side and being locked in position on the other side by a suitable catch 15 on the receptacle 1.

16 and 17 are end troughs divided by the wires 18 and hung to the ends 4 by the hooks 19 through the holes 20 and 21.

22 is a rod forming a bearing for a rotary perch above the receptacle 1 and having its ends bent downwardly and rigidly secured to the ends 4 by the brackets 23.

24, 25, and 26 are disks forming with the rods 27 the rotary perch, said perch being rotatably mounted on the bearing 22 so that the fowl attempting to stand above the food will not be able to do so as each time they spring to the rotary perch it turns and they must perforce again come to the ground; therefore the wires 10 and 13 are well guarded and the fowl are compelled to use the head stalls.

When it is required to increase the distance between the guards or wires 10 and 13 to facilitate the feeding of larger fowl the handle 9 of the rod 6 is pulled outwardly thus drawing with the rod each of the alternate wires which are securely fastened to the said rod and as the said wires are loosely mounted on the rod 12 they will slide along said rod to the desired position.

What I claim is:

In a poultry feeder, a trough, end walls extending upwardly from said trough, a rod extending along one of the sides of said trough and being slidably mounted in each of said end walls and having its ends extending outwardly therebeyond, a rod extending along the other side of said trough between said end walls and adapted to be locked to said trough and movable upwardly therefrom, a plurality of bent wires rigidly secured to said sliding rod and loosely secured to the other rod and a plurality of bent wires loosely secured to said sliding rod and rigidly secured to said other rod, said wires being alternately rigidly and loosely secured to said rods.

Signed at Toronto, Ont., this eighteenth day of September, 1914.

STANLEY OSBORNE REA.

Witnesses:
R. POUND,
W. G. HAMMOND.